United States Patent
Rhoden et al.

(10) Patent No.: US 11,187,229 B2
(45) Date of Patent: Nov. 30, 2021

(54) DEMAND FUEL SYSTEMS FOR TURBOMACHINES

(71) Applicant: Hamilton Sundstrand Corporation, Charlotte, NC (US)

(72) Inventors: William E. Rhoden, Glastonbury, CT (US); Peter J. Padykula, Brimfield, MA (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 687 days.

(21) Appl. No.: 15/623,180

(22) Filed: Jun. 14, 2017

(65) Prior Publication Data

US 2018/0363647 A1   Dec. 20, 2018

(51) Int. Cl.
| | |
|---|---|
| F04C 11/00 | (2006.01) |
| F02C 7/14 | (2006.01) |
| F02C 7/236 | (2006.01) |
| F02C 9/26 | (2006.01) |
| F02C 7/224 | (2006.01) |
| F04C 2/08 | (2006.01) |
| F04C 14/24 | (2006.01) |
| F04C 15/00 | (2006.01) |

(52) U.S. Cl.
CPC ............. *F04C 11/003* (2013.01); *F02C 7/14* (2013.01); *F02C 7/224* (2013.01); *F02C 7/236* (2013.01); *F02C 9/263* (2013.01); *F04C 2/084* (2013.01); *F04C 14/24* (2013.01); *F04C 15/008* (2013.01); *F04C 2210/1044* (2013.01); *F05D 2260/213* (2013.01); *F05D 2260/85* (2013.01); *F05D 2260/98* (2013.01)

(58) Field of Classification Search
CPC .. F02C 7/12; F02C 7/224; F02C 7/236; F02C 7/263; F02C 9/263; F02C 7/14
See application file for complete search history.

(56) References Cited

U.S. PATENT DOCUMENTS

| | | | |
|---|---|---|---|
| 3,908,360 A | * | 9/1975 | Meyer ................... F02C 7/236 60/39.281 |
| 4,643,635 A | * | 2/1987 | Leachman, Jr. ....... F02M 37/18 415/1 |
| 6,209,309 B1 | | 4/2001 | McArthur |
| 7,096,658 B2 | | 8/2006 | Wernberg et al. |
| 7,966,994 B2 | | 6/2011 | Kleckler |
| 8,127,548 B2 | | 3/2012 | Anson et al. |
| 8,256,222 B2 | | 9/2012 | Mahoney et al. |

(Continued)

FOREIGN PATENT DOCUMENTS

| EP | 2088302 A2 | 8/2009 |
|---|---|---|
| EP | 2541024 A2 | 1/2013 |

OTHER PUBLICATIONS

Extended European Search Report, dated Nov. 15, 2018, issued in corresponding European Patent Application No. 18177770.7.

*Primary Examiner* — Craig Kim
(74) *Attorney, Agent, or Firm* — Locke Lord LLP; Daniel J. Fiorello; Gabrielle L. Gelozin

(57) ABSTRACT

A fuel system for a turbomachine includes a fuel tank and a first fuel line in fluid communication with the fuel tank and one or more fuel injectors. The first fuel line includes a main fuel pump disposed on the first fuel line, and an electric metering system disposed on the first fuel line downstream of the main fuel pump configured for starting the turbomachine and metering fuel to the fuel injectors.

10 Claims, 1 Drawing Sheet

(56) References Cited

U.S. PATENT DOCUMENTS

| | | | |
|---|---|---|---|
| 9,512,783 B2 | 12/2016 | Veilleux, Jr. et al. | |
| 9,617,923 B2 | 4/2017 | Griffiths | |
| 2001/0054290 A1* | 12/2001 | Herbison | F02C 9/30 |
| | | | 60/734 |
| 2005/0217236 A1* | 10/2005 | Wernberg | F02C 7/232 |
| | | | 60/39.281 |
| 2010/0293919 A1* | 11/2010 | Poisson | F01D 19/00 |
| | | | 60/39.281 |
| 2013/0192679 A1* | 8/2013 | Ripley | B64D 37/34 |
| | | | 137/2 |
| 2016/0076452 A1* | 3/2016 | Striker | F02C 9/28 |
| | | | 60/734 |
| 2017/0159564 A1* | 6/2017 | Miller | F01D 25/18 |

* cited by examiner

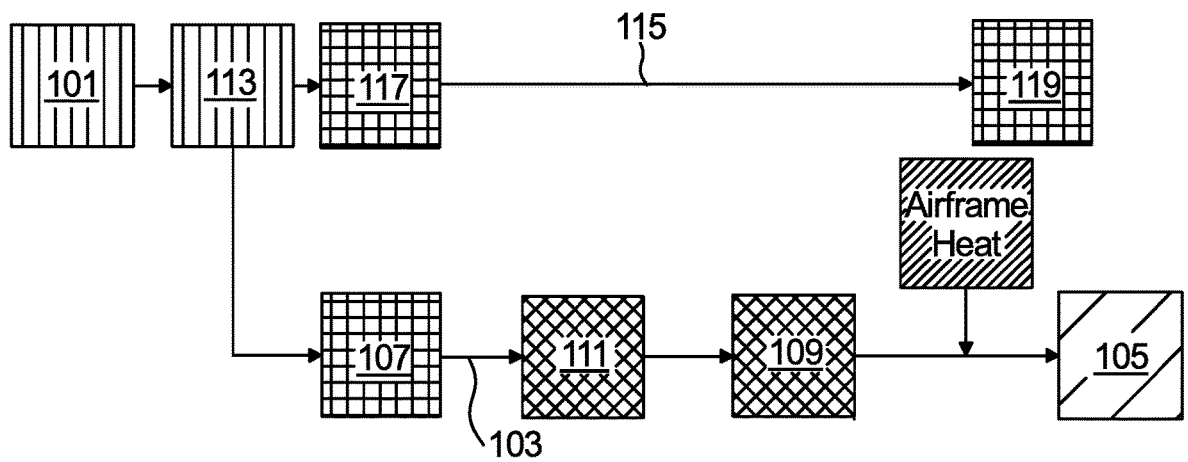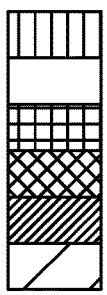

DEMAND FUEL SYSTEMS FOR TURBOMACHINES

BACKGROUND

1. Field

The present disclosure relates to fuel systems, more specifically to fuel systems for turbomachines.

2. Description of Related Art

Certain turbomachines face serious thermal management concerns with fuel temperature saturation reaching tolerable limits. Future engine and airframe systems may push performance such that fuel temperatures become the limiting factor. New architectures are needed to help mitigate increasing fuel temperatures.

Such conventional methods and systems have generally been considered satisfactory for their intended purpose. However, there is still a need in the art for improved fuel systems for turbomachines. The present disclosure provides a solution for this need.

SUMMARY

In accordance with at least one aspect of this disclosure, a fuel system for a turbomachine includes a fuel tank and a first fuel line in fluid communication with the fuel tank and one or more fuel injectors. The first fuel line includes a main fuel pump disposed on the first fuel line, and an electric metering system disposed on the first fuel line downstream of the main fuel pump configured for starting the turbomachine and metering fuel to the fuel injectors.

The metering system can include an electric metering pump that is configured to both start the turbomachine and to meter fuel flow rate to the fuel injectors. In certain embodiments, the metering system can include a separate electric starter pump and a controllable metering valve.

The main fuel pump can include a mechanical pump operatively connected to the turbomachine to pump as a function of turbomachine speed. In certain embodiments, the main fuel pump can include a vapor core pump. It is contemplated that the main fuel pump can include an electric fuel pump.

The system can include a fuel-oil cooler disposed on the first fuel line. In certain embodiments, the fuel-oil cooler is disposed between the main fuel pump and the electric metering system.

The system can include a boost pump disposed between the fuel tank and the first fuel line. In certain embodiments, the system can include a second fuel line in fluid communication with the fuel tank.

The second fuel line can include a mechanical augmenter pump and an augmenter fuel controller disposed downstream of augmenter pump to control flow from the augmenter pump. The boost pump can be disposed between the tank and each of the first fuel line and the second fuel line. In certain embodiments, the fuel system does not include a return line to the fuel tank such that the system meters fuel to the fuel injectors of a turbomachine using the electric metering system to continuously pump only required fuel to the fuel injectors and thereby eliminating a need to return fuel to the fuel tank.

In accordance with at least one aspect of this disclosure, a method for pumping fuel to a turbomachine includes using an electric metering system to meter fuel to one or more fuel injectors of the turbomachine. The electric metering system can be an electric pump configured to start the turbomachine and to meter fuel to the fuel injectors, for example. The method can further include pumping fuel to the electric metering system using a mechanical vapor core fuel pump.

In accordance with at least one aspect of this disclosure, a method for not returning fuel to a fuel tank in a turbomachine to reduce heat addition to on-board fuel includes metering fuel to one or more fuel injectors of a turbomachine using an electric metering system to continuously pump only required fuel to the fuel injectors and thereby eliminating a need to return fuel to the fuel tank.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein:

FIG. 1 is a schematic view of an embodiment of a system in accordance with this disclosure.

DETAILED DESCRIPTION

Reference will now be made to the drawings wherein like reference numerals identify similar structural features or aspects of the subject disclosure. For purposes of explanation and illustration, and not limitation, an illustrative view of an embodiment of a system in accordance with the disclosure is shown in FIG. 1 and is designated generally by reference character 100. The systems and methods described herein can be used to reduce heat addition to fuel by avoiding recirculation of fuel, for example.

Referring to FIG. 1, a fuel system 100 for a turbomachine includes a fuel tank 101 and a first fuel line 103 (e.g., a main fuel line) in fluid communication with the fuel tank 101 and one or more fuel injectors 105. The first fuel line 103 includes a main fuel pump 107 disposed on the first fuel line 103.

The system 100 includes an electric metering system 109 disposed on the first fuel line downstream of the main fuel pump 109 that is configured for starting the turbomachine and metering fuel to the fuel injectors 105.

In certain embodiments, the metering system 109 is an electric metering pump that is configured to both start the turbomachine and to meter fuel flow rate to the fuel injectors 105. In certain embodiments, the metering system 109 can include a separate electric starter pump and a controllable metering valve, for example. Any suitable components such that the metering system 109 can provide fuel as desired are contemplated.

The main fuel pump 107 can include a mechanical pump operatively connected to the turbomachine to pump as a function of turbomachine speed. In certain embodiments, the main fuel pump 107 can include a vapor core pump, for example. However, it is contemplated that the main fuel pump can include an electric fuel pump. Any suitable pump is contemplated (e.g., an electrically driven gear pump with suitable control).

The main fuel pump 107 can provide a majority of pressure in the first fuel line 103. If mechanically driven, the pump pressure/speed is related to engine speed. However, if the main fuel pump 107 includes a vapor core pump, it allows the mechanical pump to act like a flow spring as appreciated by those having ordinary skill in the art. Embodiments of a vapor core pump can act to smooth out transients in flow speed changes and provide flow to the metering system 109 as desired by the electric metering system 109.

The system 100 can include a fuel-oil cooler 111 disposed on the first fuel line 103. In certain embodiments, as shown, the fuel-oil cooler 111 is disposed between the main fuel pump 107 and the electric metering system 109. Any suitable position (e.g., downstream of electric metering system 111) is contemplated herein.

The system 100 can include a boost pump 113 disposed between the fuel tank 101 and the first fuel line 103. In certain embodiments, the system 100 can include a second fuel line 115 (e.g., an augmentor/afterburner fuel line) in fluid communication with the fuel tank 101. The second fuel line 115 can include a mechanical augmenter pump 117 and an augmenter fuel controller 119 disposed downstream of augmenter pump 117 to control flow from the augmenter pump 117.

As shown, the boost pump 113 can be disposed between the tank 101 and each of the first fuel line 103 and the second fuel line 115 (e.g., such that the boost pump 113 is a branch point). Any suitable number of boost pumps 113 are contemplated herein (e.g., one for all fuel lines, one for each fuel line).

In accordance with at least one aspect of this disclosure, a method for pumping fuel to a turbomachine includes using an electric metering system 109 to meter fuel to one or more fuel injectors of the turbomachine. The electric metering system 109 can include any suitable features as described herein. The method can further include pumping fuel to the electric metering system using a mechanical vapor core fuel pump. In certain embodiments, the fuel system does not include a return line to the fuel tank such that the system meters fuel to the fuel injectors of a turbomachine using the electric metering system to continuously pump only required fuel to the fuel injectors and thereby eliminating a need to return fuel to the fuel tank.

In accordance with at least one aspect of this disclosure, a method for not returning fuel to a fuel tank in a turbomachine to reduce heat addition to on-board fuel includes metering fuel to one or more fuel injectors of a turbomachine using an electric metering system to continuously pump only required fuel to the fuel injectors and thereby eliminating a need to return fuel to the fuel tank.

Embodiments use an electric metering and start pump that can be a fairly small electric pump where voltage on pump is related to the fuel flow. As such, embodiments include a pump being used as a valve to meter flow. The pump can also be used to start the turbomachine, and combining functions can reduce complexity and weight of the fuel system. It is contemplated that embodiments can include a separate electric fuel pump and a controllable valve for the metering system.

As appreciated by those having ordinary skill in the art, existing systems are mechanical such that any time engine is moving, it is pumping fuel, even though sometimes the engine doesn't need as much fuel as is pumped. Therefore, existing systems have a fuel loop to recirculate fuel to the tank. This adds heat to the fuel due to energy added by pumping the fuel in the loop. Every cycle adds more heat to the fuel.

Embodiments include a demand fuel system architecture that features a mechanical vapor core (VC) pump fed from a fuel tank boost pump. The VC pump in certain embodiments feeds fuel to an electric start and metering pump which precisely meters fuel to fuel injectors without the need to circulate high pressure (hot) fuel back to the tank. Embodiments include a separate feed from the fuel tank boost pump supplies a mechanical augmenter fuel pump (AFP) which pumps fuel to the augmenter fuel control and downstream spraybars (e.g., for afterburning).

Embodiments allow electric start from the metering pump. Embodiments also provide a demand system that does not require a return-to-tank loop. High flow augmentation can be provided by a mechanical AFP via a separate loop. Embodiments can be enabled by electric actuation and embodiments of the boost pump may be sized to generate start flow adequate for the metering system to work.

The methods and systems of the present disclosure, as described above and shown in the drawings, provide for fuel systems with superior properties. While the apparatus and methods of the subject disclosure have been shown and described with reference to embodiments, those skilled in the art will readily appreciate that changes and/or modifications may be made thereto without departing from the spirit and scope of the subject disclosure.

What is claimed is:

1. A fuel system for a turbomachine comprising:
 a fuel tank;
 a first fuel line in fluid communication with the fuel tank and one or more fuel injectors, the first fuel line comprising:
   a main fuel pump disposed on the first fuel line;
   an electric metering system disposed on the first fuel line downstream of the main fuel pump configured for starting the turbomachine and metering fuel to the one or more fuel injectors, wherein the metering system includes a separate electric starter pump and a controllable metering valve; and
 a fuel-oil cooler disposed downstream of the main fuel pump and the electric metering system, wherein the fuel-oil cooler is between the electric metering system and the one or more fuel injectors.

2. The system of claim 1, wherein the main fuel pump is a mechanical pump operatively connected to the turbomachine to pump as a function of turbomachine speed.

3. The system of claim 2, wherein the main fuel pump includes a vapor core pump.

4. The system of claim 1, wherein the main fuel pump includes an electric fuel pump.

5. The system of claim 1, further comprising a boost pump disposed between the fuel tank and the first fuel line.

6. The system of claim 1, further comprising a second fuel line in fluid communication with the fuel tank.

7. The system of claim 6, wherein the second fuel line includes a mechanical augmenter pump and an augmenter fuel controller disposed downstream of augmenter pump to control flow from the augmenter pump.

8. The system of claim 7, wherein a boost pump is disposed between the tank and each of the first fuel line and the second fuel line.

9. The system of claim 1, wherein the fuel system does not include a return line to the fuel tank such that the system meters fuel to the fuel injectors of a turbomachine using the electric metering system to continuously pump only required fuel to the one or more fuel injectors and thereby eliminating a need to return fuel to the fuel tank.

10. A fuel system for a turbomachine comprising:
a fuel tank;
a boost pump in fluid communication with the fuel tank;
a first fuel line in fluid communication between the boost pump and one or more fuel injectors, the first fuel line comprising:
   a main fuel pump disposed on the first fuel line; and
   an electric metering system disposed on the first fuel line downstream of the main fuel pump configured for starting the turbomachine and metering fuel to the one or more fuel injectors; and
a second fuel line in fluid communication with the boost pump, wherein the second fuel line includes a mechanical augmenter pump and an augmenter fuel controller disposed downstream of augmenter pump to control flow from the mechanical augmenter pump,
wherein the boost pump is disposed between the tank and each of the first fuel line and the second fuel line such that the boost pump is a branch point, wherein the boost pump is immediately upstream of both the main fuel pump and the mechanical augmenter pump, such that there are no valves between the boost pump and the augmenter pump or between the boost pump and the main fuel pump.

\* \* \* \* \*